US012802030B2

(12) United States Patent
Gadou et al.

(10) Patent No.: US 12,802,030 B2
(45) Date of Patent: Nov. 17, 2026

(54) METHOD FOR LOGICALLY LINKING AN ELECTRONIC DISPLAY UNIT TO A PRODUCT

(71) Applicant: VusionGroup SA, Nanterre (FR)

(72) Inventors: Thierry Gadou, Nanterre (FR); Thomas Schwarz, Hohberg (DE); Andreas Rössl, Fernitz-Mellach (AT)

(73) Assignee: VusionGroup SA, Nanterre (FR)

( * ) Notice: Subject to any disclaimer, the term of this patent is extended or adjusted under 35 U.S.C. 154(b) by 241 days.

(21) Appl. No.: 18/699,637

(22) PCT Filed: Oct. 14, 2021

(86) PCT No.: PCT/EP2021/078505
§ 371 (c)(1),
(2) Date: Apr. 9, 2024

(87) PCT Pub. No.: WO2023/061599
PCT Pub. Date: Apr. 20, 2023

(65) Prior Publication Data
US 2024/0330854 A1 Oct. 3, 2024

(51) Int. Cl.
*G06Q 10/087* (2023.01)
*G06V 20/60* (2022.01)
(Continued)

(52) U.S. Cl.
CPC ........... *G06Q 10/087* (2013.01); *G06V 20/60* (2022.01); *G09F 3/208* (2013.01); *H04W 4/80* (2018.02)

(58) Field of Classification Search
None
See application file for complete search history.

(56) References Cited

U.S. PATENT DOCUMENTS 12,118,506 B2 * 10/2024 Skaff .................... G06Q 10/087
2006/0283942 A1 * 12/2006 Nagamachi ............ G06Q 30/06 235/383
(Continued)

FOREIGN PATENT DOCUMENTS

JP 2013183929 * 3/2012 ............... A47F 5/00

OTHER PUBLICATIONS

RSS) Configuration of RFID tag to use as Electronic Shelf Label (Year: 2004).*
(Continued)

*Primary Examiner* — Victoria E. Frunzi
(74) *Attorney, Agent, or Firm* — Ashurst Perkins Coie US LLP

(57) ABSTRACT

Method for logically linking an electronic display unit to a product by means of a linking device, wherein the display unit and the product are located on a mounting structure in the detection region of an image detecting device, wherein the method comprises the method steps listed below, namely: generating image data, which represent an optical depiction of the product and the display unit by means of the image detecting device and transmitting these image data to the linking device, by means of which the logical link can be established, generating a trigger signal by means of a trigger stage which is assigned to the mounting structure, on which the display unit is mounted, wherein the trigger signal indicates the presence of an unlinked display unit in the detection region, and logically linking the as yet unlinked electronic display unit to the product in accordance with the occurrence of the trigger signal.

20 Claims, 3 Drawing Sheets

(51) Int. Cl.
*G09F 3/20* (2006.01)
*H04W 4/80* (2018.01)

(56) References Cited

U.S. PATENT DOCUMENTS

| | | | | |
|---|---|---|---|---|
| 2011/0312266 | A1* | 12/2011 | Kono | G06Q 10/087 455/7 |
| 2017/0278057 | A1* | 9/2017 | Itou | G06K 19/06103 |
| 2017/0293959 | A1* | 10/2017 | Itou | G06Q 30/0623 |
| 2018/0293593 | A1* | 10/2018 | De Bruijn | H04B 10/116 |
| 2021/0209550 | A1* | 7/2021 | Bellows | G06Q 10/0875 |

OTHER PUBLICATIONS

A Low-Cost Radio for an Electronic Price Label System (Year: 1996).*

International Search Report issued in PCT/EP2021/078505; mailed May 11, 2022.

* cited by examiner

METHOD FOR LOGICALLY LINKING AN ELECTRONIC DISPLAY UNIT TO A PRODUCT

TECHNICAL FIELD

The invention relates to a method for logically linking an electronic display unit to a product.

BACKGROUND

In modern shops product and/or price information is presented on electronic display units, in particular electronic price displays, in technical jargon called electronic shelf labels, ESL for short. Each ESL displays product and/or price information for a corresponding product, i.e. a product in the immediate vicinity of the ESL, on its screen. In order for the ESL to be able to display the correct information for the corresponding product, the ESL must first be logically linked to the correct product, i.e. a digitally stored relationship must be established, which in technical jargon is called matching. Up to now this has been realised in that a staff member with a mobile barcode scanner walks through the aisles of the shop and in each case scans or records with his/her device the barcode depicted on the screen of the ESL and on the packaging of the corresponding product. These barcodes permit unique identification of the ESL and the product. The barcodes recorded by the barcode scanner device are forwarded to a shop management software, where the logical link of the respective ESL to the corresponding product is stored digitally in a data base, the shop management software running on a server or being made available in a cloud-based manner. This method is however very time-consuming and binds personnel resources.

This has led to the invention making it its objective to provide a method, with which these disadvantages are overcome.

SUMMARY OF THE INVENTION

This objective is met by a method according to claim 1. The subject of the invention therefore is a method for logically linking an electronic display unit to a product by means of a linking device, wherein the display unit and the product are located on a mounting structure in the detection region of an image detecting device, wherein the method comprises the method steps listed below, namely: generating image data, which represent an optical depiction of the product and the display unit by means of the image detecting device and transmitting these image data to the linking device, by means of which the logical link can be established, generating a trigger signal by means of a trigger stage assigned to the mounting structure, to which the display unit is attached, wherein the trigger signal indicates the presence of an unlinked display unit in the detection region, and logically linking the as yet unlinked electronic display unit to the product in accordance with the occurrence of the trigger signal.

The inventive measures have the advantage that logically linking an electronic display unit to a product is performed fully automatically, whereby the time spent in terms of human resources for establishing such a logical linking is decisively reduced, possibly even completely avoided, and possible human-resource-related errors are completely excluded. This effect, which readily occurs for even a single display unit, is highly noticeable in particular in shops, in which several thousands of such display units have to be installed or managed/maintained in the course of time.

In this regard the logical linking process or the point in time at which logical linking is initiated, is initiated by the actual occurrence of a new display unit. Viewed in a temporal context the trigger signal indicates, when or as from when a logical linking between a display unit and a product has to be carried out.

Taking this measure means that the otherwise required permanent processing of the image data transmitted from the image detecting device to the linking device becomes redundant, whereby it would have to be constantly checked, whether an as yet unlinked display unit has appeared in the detection region of the image detecting device and a logical link would have to be established for this newly added display unit. In this respect the measures of the invention are again to be viewed in the overall context of a large supermarket for instance, in which the total of all the shelves for hundreds or even thousands of product groups would have to be continuously detected by the image detecting devices installed in the shop and the masses of image data generated in the course of it would have to be transmitted to the linking device, where the computer-aided proverbial "search for the needle in the haystack" for a potentially newly added display unit would then have to be carried out i.e. by means of expensive computerised image data evaluation. The necessary network components for transmission of the image data as well as the computing power of the linking device would be enormous.

In a move away from this the computing power required for the linking device is focused or bunched on the relevant event, i.e. the appearance of a newly added display unit, which is considerably more efficient. Depending on how the invention is implemented, as will be discussed in detail further below, the volume of data as well as its processing can thus be optimised in terms of time, contents as well as geography.

The logical linking established in the course of it, in which unique identification data of the display unit are associated or paired with unique identification data of the product or product group is digitally stored in a data base.

Further particularly advantageous realizations and further developments of the invention will be found in the dependent claims as well as in the description below.

The invention discussed here is seen as being applied in particular to an ESL system. In such a system there exists a multitude of such display units, i.e. ESLs, in order to visualize product and/or price information for a presented product or product group, respectively.

Such ESLs may be mounted on shelves or the shelf rails thereof. The mounting structure, on which the display unit and the product are located, may therefore be realised as a shelf or shelf level. Mounting on a presentation table is also possible. The mounting structure may thus also be realised as a table. The ESLs may also be realised as a display label for deployment on a table. Further such a display unit may be realised as a pendant for attachment to a piece of clothing. Or the mounting structure may be arranged as a link between the electronic display and the product. Such a mounting structure may for example also be realised as a stitching thread, needle or similar. For the sake of simplifying explanation of the invention an ESL discussed hereunder with reference to the display unit will always be one which is attached to a shelf, or in concrete terms to the shelf rail thereof.

For the purpose of visualisation of information each ESL comprises a screen which is commonly realised as an electrophoretic screen, in order to save as much energy as possible in the operation of battery-powered ESLs. Other types of screen such as for example LCD screens or similar may however also be used. Alternatively a line-bound power supply may be provided for the ESLs.

In such an ESL system there also exists a multitude of access points, which form a radio network for the communication-technical supply of the ESLs. Normally a group of ESLs is assigned, respectively, to an access point. The assignment functions by choosing a suitable radio channel in the ISM band, which is used by the respective access point, and registering the respective ESL with the appropriate access point. Radio communication may be via an essentially standardised radio protocol, such as for example ZigBee® or also Bluetooth®. A proprietary radio protocol such as e.g. the protocol disclosed in WO 2015/124197 A1 may also be used.

The access points themselves are typically cable-bound to a central control device such as for example a local server, on which a software application (e.g. the shop management software mentioned in the beginning) is executed for managing and controlling the ESLs, or alternatively connected to a cloud-based software application, which offers the functionality mentioned.

The linking device addressed in connection with this invention is also realised by said local server with a separate software executed thereon or as mentioned by a cloud-based separate software solution, which is made available via one or more external servers, or it is implemented as a part of the previously mentioned shop management software. Analogously thereto a database may be provided locally or on cloud, with the aid of which the respective logical link is stored. This software provides all functions, which serve to look for, find and ultimately identify the unlinked display unit in a digitised image or also in a video, i.e. on the basis of the image data. To this end intrinsically known algorithms for image/pattern recognition are used. The same applies to the search for a product positioned correspondingly (closely) to the found unlinked display unit in said digitised image or video. These algorithms may also be supported by artificial intelligence or be entirely based thereon.

Identifying the electronic display unit/the ESL and the product in the image data may accomplished by using pattern recognition, which examines the image data for the form and/or colour of the ESLs as well as of the products. Or pattern recognition may be used which examines the image data for letters, barcodes, QR codes or similar in order to perform identification on this basis. Or image data of different points in time (e.g. prior to the occurrence of the trigger signal and after the occurrence of the trigger signal) may be used in order to perform identification on the basis of the differences in the images or videos represented by the image data. Or the blinking of an LED (LED here means "light emitting diode") of the electronic display unit may be used in order to identify it in the image data with the aid of a unique identification code communicated by the blinking signal.

The image data analysed in the course thereof originate from the image detecting device, which may be realised as a still camera and/or video camera.

The trigger stage may be arranged to detect the presence of an unlinked electronic display unit on the mounting structure in an automatic manner and/or as a consequence of a user interaction.

If the trigger state is arranged to detect the presence of an as yet unlinked display unit on a mounting structure such as the shelf rail in an automatic manner, the trigger signal can be automatically generated and emitted directly without any further help from a staff member of the shop when attaching or positioning the display unit on the shelf rail in the vicinity of the associated or corresponding product, for which the product and/or price information has to be displayed by means of the newly added display unit. This results in an extremely quick and completely automated triggering of establishing the link.

If the trigger stage is arranged to detect the presence of an as yet unlinked electronic display unit on the mounting structure as a consequence of a user interaction, the fully automatic establishing of a logical link can be initiated or triggered in a temporally flexible and, at the same time, user-controllable manner by said user interaction of a sales assistant. As such a sales assistant has to merely perform a user interaction, for example press a button or operate a touch-sensitive element on the electronic display unit, whereupon the trigger signal is generated and emitted without any further help from the sale assistant, whereupon, as discussed, the linking process is started automatically. In this way the logical link of an already positioned electronic display unit to a new product can be triggered by the sales assistant, the product not having been placed on the shelf unit after the corresponding display unit has been positioned. The sales assistant can thus actively define or co-determine the point in time of emitting the trigger signal. The user interaction can, however, also be performed with the aid of an (external) user device of the staff member such as a personal digital assistant (e.g. realised as a tablet computer) or a mobile telephone of the staff member, wherein using this device an NFC signal (NFC here stands for "near field communication") or a Bluetooth signal is sent to the trigger stage, which initiates/triggers the fully automatic establishment of a logic link.

If the trigger stage is arranged to detect the presence of an unlinked electronic display unit on the mounting structure in an automatic manner and as a consequence of a user interaction, the mentioned advantages of these measures can be combined or the one or other measure can be used in order to initiate or start the logical linking process.

This means that a particularly time-saving and above all user-independent method can be realised if detection is performed automatically. In this respect it has proven to be advantageous if for the purpose of automatic detection during attaching the electronic display unit on the mounting structure an electronic circuit is influenced according to one the measures listed hereunder, namely:

a) by means of a mechanically actuatable contact. With this embodiment the display unit itself may for example comprise on its back an appropriate contact, which is actuated during for example fitting to a shelf rail. This is detected by a circuit in the display unit and triggers the trigger signal.

b) in a capacitive manner. With this embodiment also the display unit may for example comprise on its back an electronic element such as a capacitor configuration or similar, which reacts when approaching a shelf rail. A circuit in the display unit reacts to the changed capacity of this electronic element and triggers the trigger signal as a consequence.

c) in an inductive manner. Similarly to the capacitive triggering here again an inductive element integrated into the display unit such as a conductor loop configuration or similar may be provided, the inductivity of which is influenced when approaching or attaching to the shelf rail, which in consequence is again detected by a circuit incorporated in the display unit, which circuit in reaction thereto triggers the trigger signal.

The embodiments b) and c) may for example be in the form of oscillating circuits, which in essence form the influenceable circuit.

d) by loading an electrical power supply. This embodiment may for example be realised in that the shelf rail comprises a power supply device, which supplies electricity to the electronic display unit via cable for example. As soon as the electronic display unit is fitted into the shelf rail, a load is generated on the supply voltage provided by the electronic power supply unit, which can be electronically detected and be used for triggering the trigger signal. In this configuration it is assumed that triggering the trigger signal is performed by the power supply device.

e) due to the occurrence of an electrical power supply. With this embodiment also it is assumed that the electronic display unit attached to the shelf rail is supplied with cable-bound electricity by said power supply device. In difference to the variant as per point d) however, in this case the occurrence of the electrical power supply in the electronic display unit is the trigger for triggering the sending of the trigger signal. In this configuration triggering of the trigger signal may be by means of the display unit.

f) by signalling on an electronic bus system. With this variant also the assumption is to use a power supply device, which in difference to the preceding discussions does not only or not of necessity provide a power supply voltage, but which for the purpose of a communication-technical supply provides an electronic bus system for data and/or signal communication between the power supply device and the display unit. The display unit is connected to this bus system by, for example, plugging it into the shelf rail. As soon as the connection is established, the sending of the trigger signal can be performed by signalling via this bus system either on the side of the display unit or on the side of the power supply device.

All these measures may occur singly or in combination with each other and are preferably used in the implementation variants listed.

As discussed a particularly flexible method may be realised, if detection of the presence of an unlinked display unit is performed as a consequence of a user interaction. Here it has proven to be advantageous if for the purpose of detecting a user interaction a change of state of an electronic user interface is determined. The user interface may for example be touch-sensitive or even pressure-sensitive zones of the housing of the display unit or a touch-sensitive screen of the display unit. By means of an electronic circuit of the display unit a user interaction detected by means of these touch-sensitive and/or pressure-sensitive elements may be processed further and this may also subsequently be used for generating and sending the trigger signal.

As has already been addressed, according to one embodiment the electronic display unit may comprise a trigger stage and generating the trigger signal is performed by the electronic display unit itself. It is thus ensured that the electronic display unit can autonomously start, i.e. trigger the logical linking process independently of other system components. This embodiment presumes that the individual electronic display units comprise the electronic components necessary for realising the trigger stage. Such electronic display units offer the advantage that they can be positioned at any positions, i.e. can be positioned at random and are not dependent on any other system components in order to generate and send the trigger signal.

On the other hand, again as already addressed, the electronic display unit, which according to another embodiment is arranged on a shelf rail for the electronic and/or communication-technical supply of at least one electronic display unit, may comprise the trigger stage, and generating the trigger signal is performed by the electronic display unit. This has the advantage that for each mounting structure, i.e. for example the shelf rail, there exists a central instance, which starts the logical linking. The display units to be installed on the respective shelf rail may be of relatively simple construction and can therefore be manufactured in a relatively low-cost manner. The electronics required for the trigger stage is then, for each shelf rail, integrated only once in the power supply unit. Preferably the electronic display unit is arranged on a shelf rail for electronically or communication-technically supplying power to a number of electronic display units. The number of required electronic components in the system can thus be considerably reduced, which reduces the cost for both providing and maintaining the system.

Preferably the trigger stage comprises a radio signal transmitting stage, and a radio signal, in particular a Bluetooth-Low-Energy radio signal, is sent as the trigger signal by the radio signal transmitting stage. In particular due to the realisation by means of a Bluetooth-Low-Energy radio signal it is possible to perform signalling which is detectable only locally in close vicinity of the trigger stage.

Emitting the trigger signal can also be done by quite generally using a so-called beacon or radio beacon, which identifies itself by its beacon characteristic. It is therefore not, of necessity, limited to using a Bluetooth-Low-Energy radio signal.

Reception of this trigger signal is thus restricted to the field of propagation of the trigger signal limited by means of the chosen signal strength or transmission power. A receiver, the subject of which is still to be discussed further below, must therefore be positioned within a region, in which the trigger signal can be received and utilised. This results in a natural spatial delimitation around the device transmitting the radio signal, so that in order to find the unlinked display unit only the image data within this spatially limited region need to be evaluated. Naturally another radio signal can also be used, which has a larger range or which can be received only very locally.

Optionally the trigger stage may comprise a light signal emitting stage and a light signal, in particular an LED light signal, is emitted as the trigger signal by the light signal emitting stage. This light signal may be located in the visible spectrum, preferably however not in the visible spectrum, so as not to irritate the customers in the shop. Here again only a spatially limited region is under consideration, in which the emitted light signal can be received by a receiver. At the same time however, the light signal can make evaluation of the image data easier because it can be detected as such in the image data. By detecting the light signal in the image data, conclusions can be drawn as to the position of the as yet unlinked display unit or how to delimit its position in the detection region of the image detection unit.

In this context it should also be mentioned that the light signal can be used—given the computerised fully automatic evaluation of the image data—to detect for example the position of product presentation tables or shelf floors or even shelf rails by means of the linking device.

Light signalling, quite generally, thus makes identification of the horizontal levels in shelves easier.

According to a further aspect of the invention a trigger signal receiving stage is provided, with which the trigger signal is received and the receiving of the trigger signal is used as trigger for data processing.

In line with the options listed for the trigger signal, the receiving stage may be a light-sensitive electronics or a radio signal receiver.

The trigger signal receiving stage, according to one embodiment, may be arranged to check, whether the received beacon is destined for it and its associated camera, i.e. whether this is a beacon, which is admissible for the purpose of linking ("matching") an ESL to one of the products, and in this case to instruct the camera, to begin recording and to generate and emit image data. Checking the beacon ahead as to whether this is assigned to the appropriate trigger signal receiving stage may be of advantage in particular if in the shop further beacons have to be reckoned with, which are emitted by other radio systems or radio devices for other purposes and which can also be received by the trigger signal receiving stage. Checking the beacon in advance of the start of the cameras assigned to the respective signal receiving devices is of advantage insofar as in this way the amount of image data to be further processed is restricted to the absolutely necessary extent—i.e. to the image data generated by the one single camera or very few cameras. The upstream checking of the beacon thus represents a filter in order not to admit all beacons possibly receivable in the shop as trigger for generating image data. A further natural filter results from the preferably small range of the beacon (such as e.g. a preferably used Bluetooth® Low Energy Beacon), which limits the number of trigger signal receiving stages receiving this beacon.

According to a second embodiment the trigger signal receiving stage may however also be arranged to start the camera directly upon receipt of a beacon, so that the image data are generated and output. Starting the camera without previously checking the beacon as to whether this is assigned to the receiving trigger signal receiving stage, may be of advantage then, when it is assumed that no other interfering beacon is to be expected, i.e. when for example the beacon envisaged for "matching" is emitted on a radio channel not otherwise used.

According to one embodiment the trigger signal receiving stage controls the image detecting device and the trigger for data processing causes the image detecting device to start generating the image data.

In this embodiment the start of transmitting the image data and their receipt at the linking device causes the start of the logical linking process at the linking device. In the present case the formulation "in accordance with the occurrence of the trigger signal" mentioned in the beginning means that the process of logically linking the as yet unlinked electronic display unit to the respective product is not performed until the trigger signal has triggered the generation and transmission of the image data and these image data have arrived at the linking device.

According to a further embodiment the trigger signal receiving stage activates the image detecting device and the trigger for data processing causes embedding of the meta data in the image data by the image detecting device. These meta data mark the relevant point in time or time range in the image data or in their data stream, at which the presence of the unlinked display unit was indicated by the trigger signal.

In this embodiment the occurrence of the meta data in the image data received at the linking device starts the process of logically linking at the linking device. Expressed in other words this means that the meta data are detected in the image data received at the linking device by the linking device and in consequence the process of logically linking the as yet unlinked electronic display unit to the product is started. In the present case the formulation "in accordance with the occurrence of the trigger signal" mentioned in the beginning means that the process of logically linking the as yet unlinked electronic display unit to the respective product is not performed until the trigger signal has triggered the embedding of the meta data in the image data and the linking device has detected the meta data in the received image data.

The meta data mentioned here may be in a predefined data format such as for example an unequivocally identified binary code, which is already known to the linking device and/or is embedded in a deferential manner in the image data or the data stream thereof.

In the last two mentioned embodiments the trigger signal receiving stage may be designed as a separate device which controls the image detecting device via a signal line. Preferably however, the trigger signal receiving stage is an integral constituent of the image detecting device such as for example a Bluetooth receiver. As soon as the receiving stage receives the trigger signal, generation and transmission of the image data is started.

According to a further embodiment the trigger signal receiving stage directly controls the linking device and the trigger for data processing causes a start of the process of logically linking at the linking device. According to this embodiment image data from one or a number of image detecting devices may be transmitted continuously to the linking device. The CPU-intensive process of logically linking the as yet unlinked display unit to the respective product is however not started until the trigger signal receiving stage triggers it. In this embodiment the receiving stage can also be provided as a separate module or device, which controls the linking device by means of a control signal. Preferably the trigger signal receiving stage is however realised here too as an integral part of the linking device.

In all the embodiments discussed the linking device looks for and identifies the unlinked electronic display unit in the generated image data. Subsequently it searches for and identifies in the generated image data a correspondingly positioned product for the position of the found and identified electronic display unit, which product is not as yet linked to an electronic display unit, and generates logical linking data for the purpose of logically linking the identified electronic display unit to the identified product and stores these data in a digital manner.

In order to simplify the search and the identification of the unlinked electronic display unit in the image data for the software to be used for this purpose, it may be provided that each display unit comprises its own light-emitting device. This may be a separate LED, which is preferably used in addition to an electrophoretic screen, or it may also be the background lighting of for example an LCD screen. As soon as the sending of the trigger signal is started at the display unit, a light signal is also emitted by means of the LED, which makes finding it easier in the depicted shop region detected by means of the image detecting device. The light signal may be in the form of one-time blinking, multi-times blinking or a permanent light emission or even a modulation of the intensity of the light signal.

It may however also be provided that such a light-emitting device is provided only once for each power supply device. In this configuration at least the light-emitting device can be identified in said depiction. Starting from the position of the light-emitting device, that region, in which finding the display unit is highly probable, can then be easily delimited, because for example when using one shelf rail and one power supply device per shelf rail, it is assumed that the display unit to be found can only be positioned on the left-hand or right-hand side of this power supply device along the shelf rail. The direction of the search can however be restricted still further, if the as yet unlinked display units are to be looked for only on the right-hand side or only on the left-hand side of the power supply device, namely because the power supply device can only be installed on the left edge of the shelf rail or only on the right edge of the shelf rail.

According to a further aspect of the invention it may also be provided that with the aid of the light-emitting device, in particular the LED, which is formed either on the display unit or on the power supply device, a coded light signal is emitted, with the aid of which identification of the respective searched for display unit is made easier or that even the identification code as such, i.e. for the example the code, which is also indicated as barcode on the screen of the display unit to be searched for, is communicated.

Furthermore it may be provided that the image detecting device can also focus or zoom onto a partial region of the detected total region. This may be helpful in particular if it is possible to delimit as previously discussed each image region, in which the probability is high that the unlinked display unit will be found. Preferably focusing or zooming with the image detecting device is performed digitally, i.e. without mechanical components. With the linking device the image data generated therewith can be evaluated substantially quicker and more accurately than would be case if the entire region would have to be evaluated.

In conclusion it should be mentioned quite generally that the discussed electronic devices comprise of course electronics. The electronics may consist of discrete electronics or integrated electronics or from a combination of both. Microcomputers, micro controllers, application-specific integrated circuits (ASICs), possibly in combination with analogue or digital electronic peripheral components may also be used. Radio devices normally comprise an antenna configuration as part of a transceiver module for sending and receiving of radio signals. The display units are preferably battery-driven.

These and further aspects of the invention are revealed in the figures discussed hereunder.

SHORT DESCRIPTION OF THE FIGURES

The invention will now be discussed once more in detail with reference to the attached figures by way of exemplary embodiments, to which the invention is however not restricted. In the different figures identical components are marked with the same reference symbols, in which schematically:

DESCRIPTION OF THE EXEMPLARY EMBODIMENTS

Figure 1:
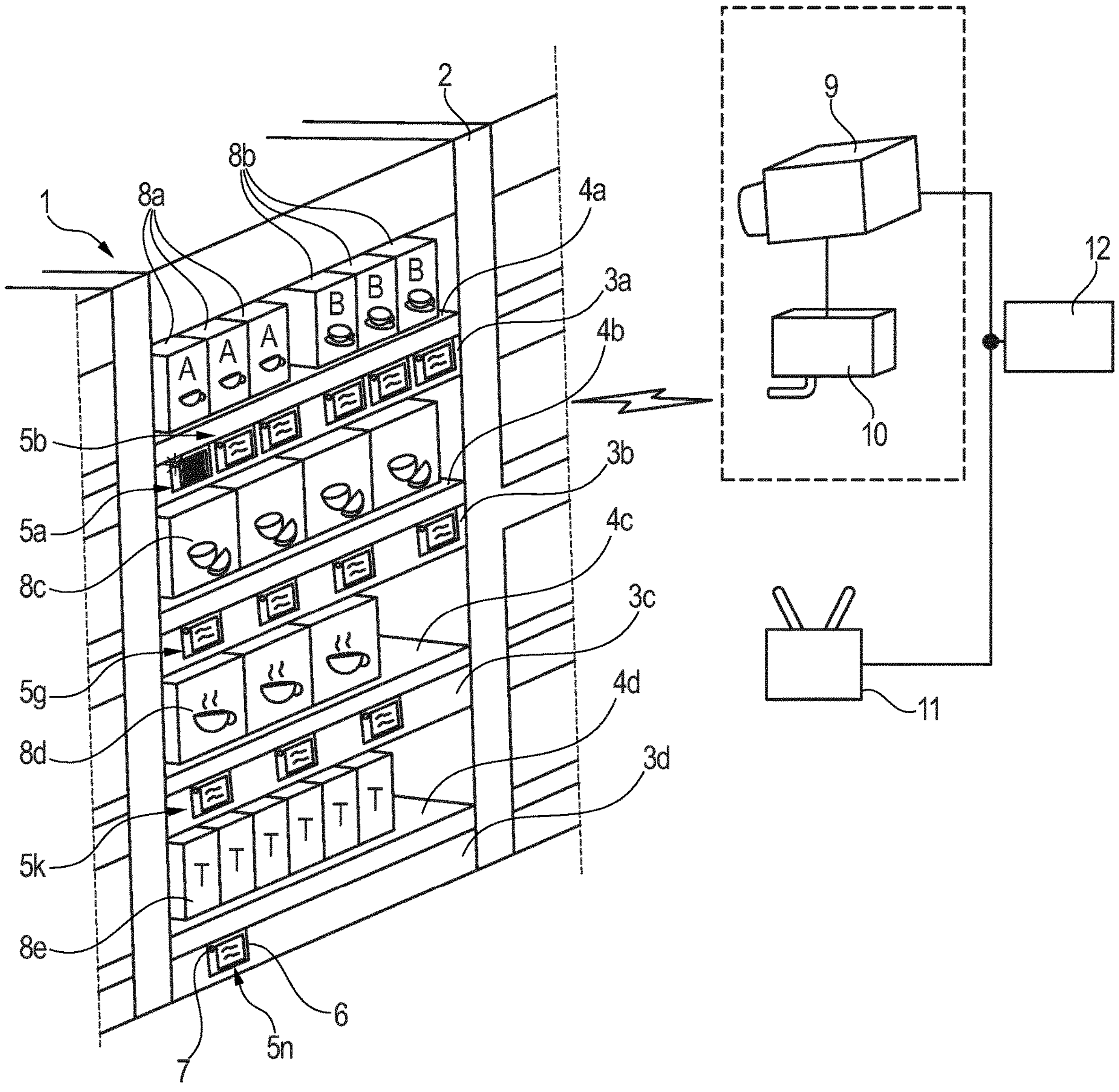
FIG. 1 shows a system, with which an inventive method according to a first embodiment is provided.

FIG. 1 shows a system 1, with which a method for establishing a logical link between an electronic display unit 5*a* to 5*n*, from now on called ESL (electronic shelf label) 5*a* to 5*n* in technical jargon, and a product 8*a* to 8*e* is performed.

The system is installed in the premises of a supermarket, of which in the present case for the purpose of discussing the invention only a small cut-out is depicted. The drawing shows a product presentation device, which is realised as shelf 2. The shelf 2 comprises four shelf levels 4*a*, 4*b*, 4*c*, 4*d*. One shelf rail 3*a*, 3*b*, 3*c*, 3*d* is provided for each shelf level 4*a* to 4*d*. The whole supermarket comprises of course a multitude of such shelves 2, as well as further electronic components of the system 1, wherein these are not visible because the drawing only shows a cut-out.

The system 1 comprises a camera 9 with a signal receiving device 10, an access point 11 and a linking device 12 and the mentioned ESLs 5*a* to 5*n*. The ESLs 5*a* to 5*e* are attached to the front of the shelf rails 3*a* to 3*d*. For the sake of clarity and in order not overload the figures, not all ESLs 5*a* to 5*n* have been marked with reference symbols.

Each ESL 5*a* to 5*n* comprises a screen 6 and a light-emitting diode, abbreviated to LED 7, which is representative for all ESLs 5*a* to 5*n* and is indicated with its reference symbol 7 only for the lowermost ESL 5*n*. The screen 6 is thus realised as an electrophoretic screen and is destined, as long as ESL 5*a* to 5*n* is not linked, to display a barcode identifying the ESL 5*a* to 5*n* and as soon as the ESL 5*a* to 5*n* is linked, to display product and/or price information. LED 7, controlled by electronics (not shown in detail) of the ESL 5*a* to 5*n*, is provided to emit a light signal. The light signal here is a coded blinking, which in a temporal context of blinking permits identification of the respective ESL 5*a* to 5*n* and in a spatial context permits easier finding of the ESL in the image detected by camera 9.

Each ESL 5*a* to 5*n* also comprises a Bluetooth-Low-Energy-Beacon transmitter 16, also called a beacon transmitting stage, (see also FIG. 4), which is arranged and used to emit a Bluetooth® compliant radio beacon signal, from now on called "beacon" for short. This beacon comprises a unique identification code, which allows unequivocal identification of the transmitting device, in the present case the respective ESL 5*a* to 5*n*, in which the Bluetooth-Low-Energy-Beacon Sender 16 is integrated.

Each ESL 5*a* to 5*n* also comprises a radio system 17 (see FIG. 4), for radio communication with the access point 11 in accordance with an access point communication protocol, as has been discussed in the general part of the description.

FIG. 1 shows, on each shelf level 4*a* to 4*d*, products 8*a* to 8*e*, wherein on the first shelf level 4*a* counted from above a first group of products 8*a* labelled "A" and a second group of products 8*b* labelled "B" can be seen. The second shelf level 4*b* counted from above shows a third group of products 8*c* with an individual imprint on its packaging. The third shelf level 4*c* counted from above shows a fourth group products 8*d* again with an individual imprint on its packaging. The lowermost shelf level 4*d* counted from above shows a fifth group of products 8*e* labelled "T". The individual groups of products 8*a* to 8*e* concern different products and are outwardly different from each other in their respective packaging, i.e. in format and size etc. and in the imprint on the respective packaging.

Furthermore one can see one of many detection units (framed by a broken line), which—as shown—comprises the camera 9 and a signal receiving device 10.

The linking device 12 in the present case is realised by a local computer in the supermarket, on which a shop management software is executed, which provides all functions, which are required in a supermarket in order to manage the stock of products 8*a* to 8*e*, their price information or associated product information, and also in order to subsequently generate the pairing or logical connection of the products 8*a* to 8*e* to the ESLs 5*a* to 5*n* and/or to provide this in form of a planogram for simple visualisation. The linking device 12 is thus realised as a central linking unit and connected via cable to several access points 11 as well as to several detection units, wherein the access points 11 are distributed in the shop in such a way that a radio connection is possible with all ESLs 5*a* to 5*n*, and wherein the detection units are arranged in a distributed manner, i.e. positioned and aligned in the shop in such a way that all ESLs, which are scheduled to be detected by means of the detection devices, can be detected in this way. In this embodiment each detection device is concretely installed in the ceiling of the shop in such a way that at least one shelf can be completely optically detected with it.

The access point 11 provides the radio-technical connection between the linking device 12 and the ESLs 5*a* to 5*n*, wherein product and/or price information stored in the linking device can be transmitted via this radio-technical connection to the ESLs 5*a* to 5*n*, so that each ESL 5*a* to 5*n*—as soon as it is logically linked to the respective product or the respective product group—can display individual product and/or price information. Each ESL 5*a* to 5*e* therefore must be linked or matched to a product 8*a* to 8*e*, so that the respective ESL 5*a* to 5*n* can display the relevant product and/or price information. Also, the device status of each ESL 5*a* to 5*n* can be queried via this radio-technical connection, and, as required, can be bidirectionally communicated. Normally the ESLs 5*a* to 5*n* are assigned group-wise to different access points 11, which is, however, not discussed any further herein.

The camera 9 is arranged to digitize an optical depiction of the shelf 2 and to transmit these digitised depictions in the form of image data to the linking device 12, where these are processed. These image data may for example represent stills or videos.

The signal receiving device 10 is arranged to receive radio signals, in particular the beacon of one of the ESLs 5*a* to 5*n* and in consequence thereof to trigger further actions. To this end the signal receiving device 10 comprises a Bluetooth-Low-Energy receiver.

The method mentioned in the beginning will now be discussed in detail. In FIG. 1 it is assumed that the upper left ESL 5*a* has only just been fitted into the shelf rail 4*a*.

In this embodiment the ESL 5*a* itself comprises a detection device (not shown in detail), which detects fitting the ESL 5*a* into the shelf rail 4*a*. This may be realised for example by means of a contact on the ESL 5*a*, wherein the contact may for example be actuated by a pin protruding from the housing while the shelf rail is being fitted, and the actuated contact closes a circuit of the electronics of ESL 5*a*, which is detected by the detection device on the basis on a current flow through the contact. This may however also be triggered by an external trigger such as e.g. with the aid of a portable NFC-capable device of a staff member, which sends an NFC signal to the ESL 5*a*, the ESL also being NFC-capable, which is detected by the detection device.

In the present case the contact together with the electronics of the ESL 5*a* forms a trigger stage, which also comprises a radio signal transmitting stage for emitting the beacon as trigger signal for triggering the process of logical linking.

In consequence of detecting the fitting of the ESL 5*a* to the shelf rail 4*a* three actions are triggered/started in this embodiment by the ESL 5*a* fitted just now to the shelf rail.

Firstly the not yet logically connected ESL 5*a* starts an identification mode and displays a graphic identifying the ESL 5*a* on the screen 6 of the newly fitted ESL 5*a*. In this case the identifying graphic is the barcode, which unequivocally identifies the ESL 5*a*. This barcode is then used to link or match the ESL 5*a* to the product 8*a*, i.e. to establish the logical connection between the respective product 8*a* and the ESL 5*a* fitted just now into the shelf rail 3*a* corresponding to the products 8*a* and to store it in the linking device 12.

Secondly the ESL 5*a* just fitted into the shelf rail 3*a* initiates the emission of the light signal as a blinking signal by the LED 7. The frequency of blinking may be constant or variable. In this embodiment the LED 7 blinks with a variable frequency, to be exact blinks in a rhythm, which allows identification of the ESL 5*a*. This second action is subsequently utilised to ascertain the position of the newly fitted ESL 5*a* on the basis of the image data generated by means of the camera 9.

Thirdly the Bluetooth-Low-Energy-Beacon transmitter of the ESL 5*a* just fitted into the shelf rail 3*a* initiates emission of the beacon. The third action is subsequently utilised to start image detection with the camera 9, for which the beacon can be received by means of its signal receiving device 10, because it is in the receiving region. The beacon thus acts as a trigger for image detection with the camera 9, which forms the basis for an automatic matching of products 8*a* or 8*b* on the shelf level 4*a* to the newly added ESL 5*a* on this shelf level 4*a*. The signal receiving device 10, also called trigger signal receiving stage, receives the beacon emitted from the upper left ESL 5*a* and checks, whether this is a beacon, which is admissible for the purpose of matching an ESL to one of the products. The signal receiving device 10 has been programmed in advance in such a way that it can distinguish between a "correct" beacon emitted by one of the ESLs 5*a* to 5*n* and any other beacons possibly appearing in the shop. When the signal receiving device receives a beacon provided for matching, as may be assumed in this case, it activates the camera 9, so that this outputs image data to the linking device 12.

The occurrence of the "correct" beacon therefore informs the system 1, the camera 9 in detail and subsequently the linking device 12 about the presence of a new ESL, here concretely the ESL 5*a*.

The linking device 12 has the image data of the camera 9 sent to it almost in real time for fitting into the respective ESL 5*a*. The linking device 12 examines the image contents represented by the image data in this embodiment in the following manner/for the following features.

Firstly the linking device 12 examines the new image contents as to whether a newly added ESL (here ESL 5*a*) is present, which had not been present in older image contents, which were present prior to the occurrence of the trigger signal, i.e. as to whether the ESL 5*a* detected on the shelf 2 by the camera 9 has been newly added and focuses the further evaluation of the image contents thereon.

Secondly the linking device 12 checks the image contents as to whether the barcode, which identifies the newly added ESL 5*a*, is present and recognisable in the focus of the evaluation.

Further, the linking device 12 checks the image contents, as to whether it can be recognised that the LED 7 of the ESL 5*a* blinks or shines, in particular in the corresponding (known) rhythm. This check, analysis or evaluation can be performed later or even at the same time as the checks discussed earlier under "firstly" and "secondly". Identifying the blinking or shining helps to delimit the approximate image region, in which the newly added ESL 5*a* is located.

In the image data the area surrounding the blinking LED 7 can be easily determined both in terms of locality and over time. Local differences in brightness in the image contents permit focusing on the area surrounding the LED 7. Also the temporal change of the difference in brightness caused by the LED 7 in the image contents permits focusing on the region surrounding the LED 7. Other regions of the image contents by contrast show fewer significant differences in colour and brightness. When analysing the image contents the linking device 12, due to the blinking of the LED 7, can therefore quickly find the relevant region in the image contents, in which the newly added ESL 5*a* is located.

The linking device 12 uses the known position of the LED 7, in order to look for the barcode next to the image contents, with which the ESL 5*a* is identified. As soon as the barcode is found, it evaluates this and identifies the ESL 5*a*, which of course had already been registered in the linking device 12 for use in the supermarket.

Once the ESL 5*a* fitted just now into the shelf rail 3*a* has been found and identified in the image contents, the linking device 12 evaluates the image contents in that it detects the product 8*a* to be found next to the ESL 5*a*. In the present case this is a shelf 3 as seen in FIG. 1, where the ESLs 5*a* to 5*n* are always arranged below the product 8*a* to 8*e* assigned to them. The linking device 12 is informed about this circumstance or automatically recognises this circumstance because of the systematic arrangement of the items on shelf 2 and therefore looks in the image contents for a product, which can be found above the detected ESL 5*a* and identifies the found product 8*a*.

The identification of the ESL 5*a* and the identification of product 8*a* are based essentially on pattern recognition. To this end the linking device 12 on the one hand compares the image contents to the digital images of the products stored on the computer. On the other end the image content is also checked for known patterns such as barcodes, QR codes, letters and numbers. Therefore text recognition can also be provided here. With regard to the respective product there may have also been made provision for this to be registered in advance at the linking device 12 for use in the supermarket. The product can also be registered on the basis of the analysis of the image contents and the information gained therefrom for use in the supermarket.

As soon as the ESL 5*a* and the product 8*a* have been identified, the linking device 12 establishes the logical link between the product 8*a* and the ESL 5*a* and stores this in a digital manner in a data base, which is hosted on the computer. This in fact implies automatic "matching" of the ESL 5*a* to the product 8*a*.

The product and/or price information is then communicated from the linking device 12 to the ESL 5*a* via the access point 11. For completeness' sake it remains to be mentioned at this point that the ESL 5*a* has of course previously been registered radio-technically in the known manner with the access point 11 and therefore has radio coverage because of access point 11. As soon as the ESL 5*a* has received the product and/or price information, it leaves the identification mode and displays the product and/or price information on its screen 6.

The process described here can be performed for all ESLs 5*a* to 5*n* (and products). In particular this all-encompassing process is performed when the system is installed for the first time or when the shelves are stacked with products and fitted with ESLs. On the basis of the image contents communicated by the cameras 9 the entire shop is digitally cartographed with the aid of the linking device 12, i.e. the position of the ESLs 5*a* to 5*n* and products 8*a* to 8*e* on the shelves and also on the shelf levels is digitally detected, with their positions, possible including a three-dimensional position indication, being stored in a digital data structure, which is used for the computer-supported creation of a planogram. The planogram obtained in this way is a visualisation of then placement of the articles on the shelves/shelf levels of the shop. In the course of operating the business there may be changes in the positions for products 8*a* to 8*e* and assigned ESLs 5*a* to 5*n*, which is however automatically detected as previously discussed and incorporated in the planogram practically in real time. The planogram is therefore dynamically updated.

Figure 2:
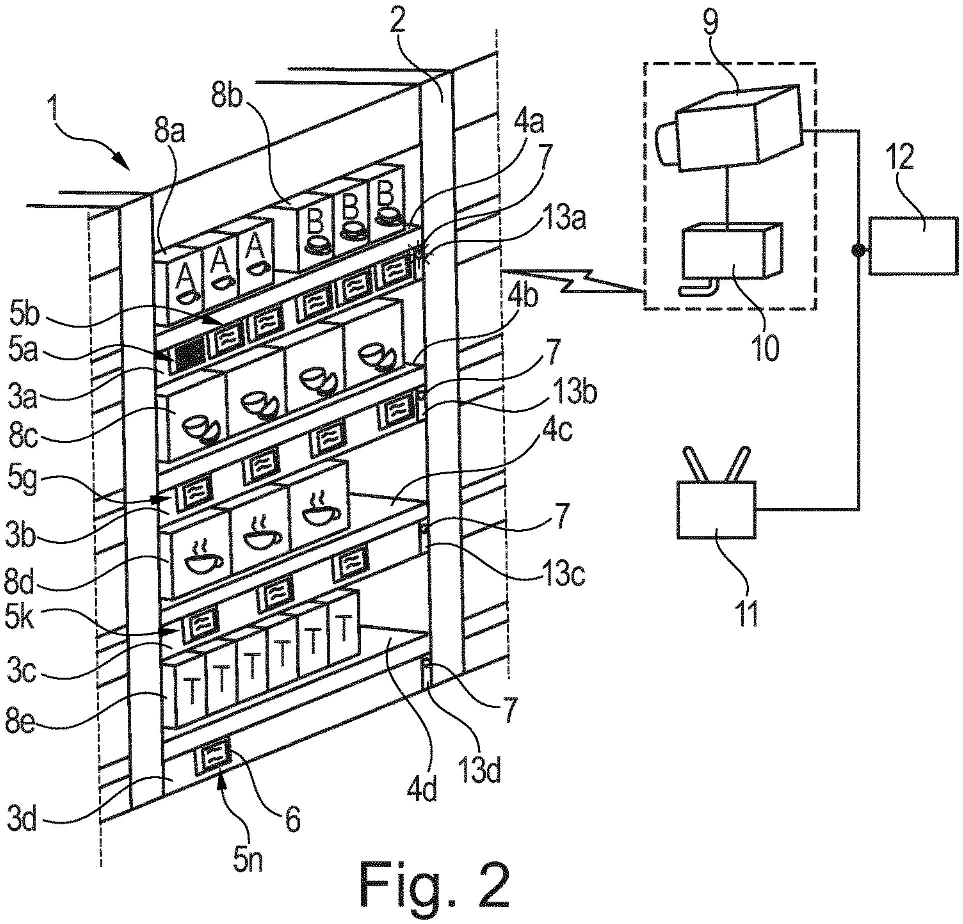
FIG. 2 shows a system, with which an inventive method according to a second embodiment is provided.

In contract to FIG. 1 the shelf levels 4*a* to 4*d*/each shelf rail 3*a*-3*d* in the embodiment shown in FIG. 2 are/is equipped with a separate shelf rail control unit 13*a*, 13*b* 13*c* and 13*d*, also called electronic power supply unit. Each shelf rail control unit 13*a* to 13*d* is communication-technically connected to the ESLs 5*a*-5*n*, which are located on the respective shelf rail 3*a* to 3*d*, on which the respective shelf rail control unit 13*a* to 13*d* is also mounted, and controls the same. The connection may for example be cable-bound/line-bound or may be by means of inductive coupling directly to the respective shelf rail 3*a* to 3*d*.

Each shelf rail control unit 13*a*-13*d* incorporates the access points 11 for radio-technical communication. Each shelf rail control unit 13*a*-13*d* supplies the ESLs 5*a*-5*n* communication-technically connected thereto with energy directly at the respective shelf rail 3*a* to 3*d*. The shelf rail control unit 13*a*-13*d* itself may be supplied with energy via cable or via a rechargeable accumulator or a battery or even via radio, such as e.g. by means of "power over Wi-Fi".

The shelf rail control unit 13*a*-13*d* therefore represents an intermediate link in the communication of the ESLs 5*a*-5*n* with the linking device 12. Communication of the ESLs 5*a*-5*n* with the linking device 12 is therefore as before via the access point 11, but with the interposition of the respective shelf rail control unit 13*a* to 13*d*.

In contrast to the embodiment in FIG. 1, here it is not the ESLs 5*a* to 5*n* but the shelf rail control units 13*a* to 13*d*, which comprise the LED 7 and the Bluetooth-Low-Energy-Beacon transmitter 16 and which here too are used for the purposes of focusing/ease of image evaluation with the aim of fully-automated logical linking, i.e. matching of the ESLs 5*a* to 5*n* with the product 8*a* to 8*e*, which will be discussed in detail hereunder.

This embodiment has the advantages that the ESLs 5*a* to 5*n* mounted on the shelf rail 3*a* to 3*d* can be realised at low cost and substantially easier than is the case with the embodiment in FIG. 1. The energy consumption of system 1 is also reduced/optimised because only one device per shelf rail 3*a* to 3*d* at most is required to blink and emit the beacon, even then when several ESLs 5*a* to 5*n* are newly fitted.

If now, for example, the upper left ESL 5*a* is newly fitted into the shelf rail 3*a*, the shelf rail control unit 13*a* automatically detects the appearance of the new ESL 5*a*. This can for example be recognised by means of the change in energy consumption/the electrical power drawn. Also, the ESL 5*a* can communicate a signal to the shelf rail control unit 13*a*, by means of which the shelf rail control unit 13*a* recognises that a new ESL 5*a* is present. Automatic signalling can also be provided via the line during fitting the ESL 5*a* to the shelf rail.

The newly added ESL 5*a* is in identification mode as mentioned and the identifying barcode is unequivocally displayed on its screen 6. Alternatively the shelf rail control unit 13*a* can send a signal to the ESL 5*a*, wherein the signal places the ESL 5*a* into identification mode.

Once the shelf rail control unit 13*a* has detected the fitting of the newly added ESLs 5*a*, it now emits the beacon and controls its LED 7 such that the LED 7 emits a blinking signal.

The signal receiving device 10 located in the receiving region of the beacon receives the beacon emitted by the uppermost shelf rail control unit 13*a* and in consequence thereof starts image detection with the aid of its camera 9. The camera 9 detects the shelf 2 also in this embodiment, generates the image data and transmits these to the linking device 12 for further processing.

The linking device 12, by means of the blinking signal of the LED 7, initially identifies in the image contents the shelf rail 4*a*, in which the newly added ESL 5*a* is expected to be found, wherein here as well the differences compared to older image contents are analysed as required in order to delimit the position of the newly added ESL 5*a* and to look there for the barcode of the ESL 5*a*. During the search for the newly added ESL 5*a* it is helpful that the linking device 12 knows that the ESLs 5*a* to 5*n* (extending essentially horizontally) are always positioned to the left of the respective shelf rail control unit 13*a* to 13*d*. When the barcode is found the ESL 5*a* is identified therewith and as before in connection with the first embodiment the associated product 8*a* is identified and the ESL 5*a* is logically linked to the product 8*a*, i.e. matching is performed.

Figure 3:
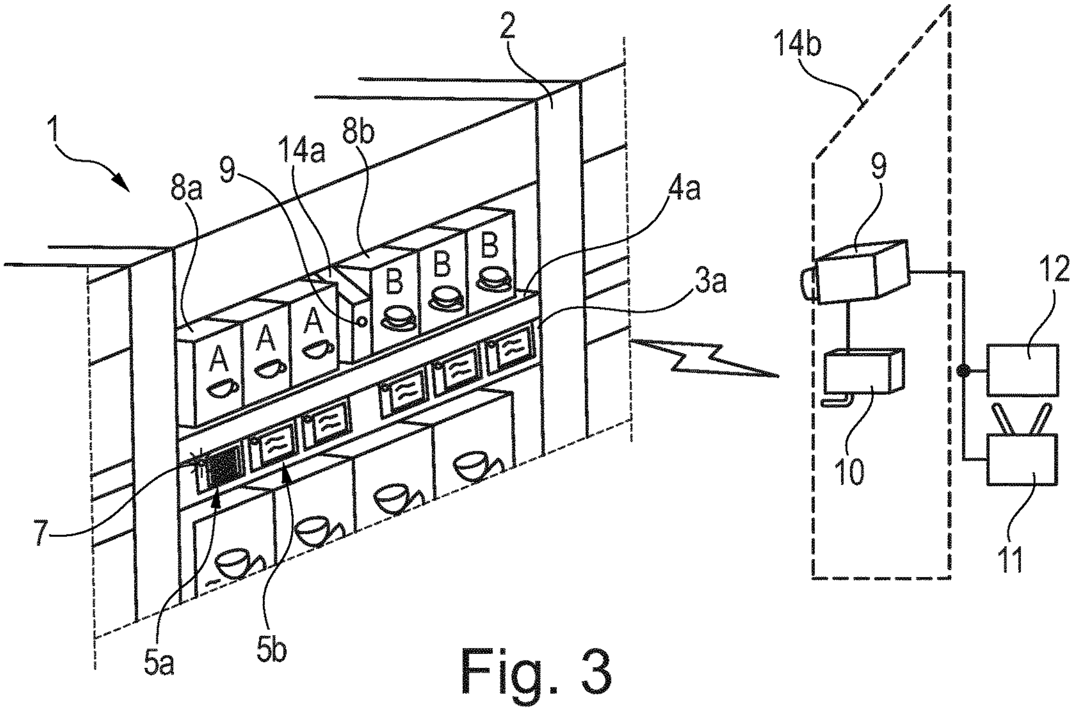
FIG. 3 shows a system, in which an inventive method according to a third embodiment is provided.

In contrast to the embodiment shown in FIG. 1 a first shelf separating device 14*a* is provided in the embodiment discussed with reference to FIG. 3, which is attached to a first shelf 2, and also for a second shelf separating device, which is attached to a second shelf 2. The two shelves 2 are flanking a shelf aisle. The shelf separating devices 14*a* and 14*b* are used to structurally divide a shelf level (here the shown shelf level 3*a*) into two regions, wherein one group of products 8*a*, and separated therefrom, the other group of products 8*b* is shown in the respective region.

In this embodiment the camera 9 and its signal receiving device 10 are integrated in the shelf separating device 14*a* and 14*b*. The cameras 9 are attached to the front wall of the shelf separating devices 14*a* and 14*b* and detect with their detection region in this configuration discussed here the opposite shelf 2 across the shelf aisle. In other words each of the cameras 9 detects the opposite shelf 2.

Each shelf separating device 14*a* and 14*b* also comprises a radio device 17 configured analogously to the ESLs 5*a* to 5*n*, in order to be able to communicate by means of the access point 11 with the linking device 12, in order to be able to transmit the image data of the camera 9.

The ESLs 5*a* to 5*n* are configured as in the embodiment in FIG. 1 and start their identification mode as discussed there.

The beacon emitted by the ESLs 5*a* to 5*n* triggers as discussed image detection of the cameras 9 and the linking device 12 identifies the newly added ESL as discussed and matches it with the product located at the respective position.

Combinations of the discussed embodiments are also possible. So for example, in the embodiment discussed in connection with FIG. 2 the camera 9 may for example also be integrated in a shelf separating device 14*a*. Mixed configurations of the embodiments on one and the shelf may also be provided.

Figure 4:
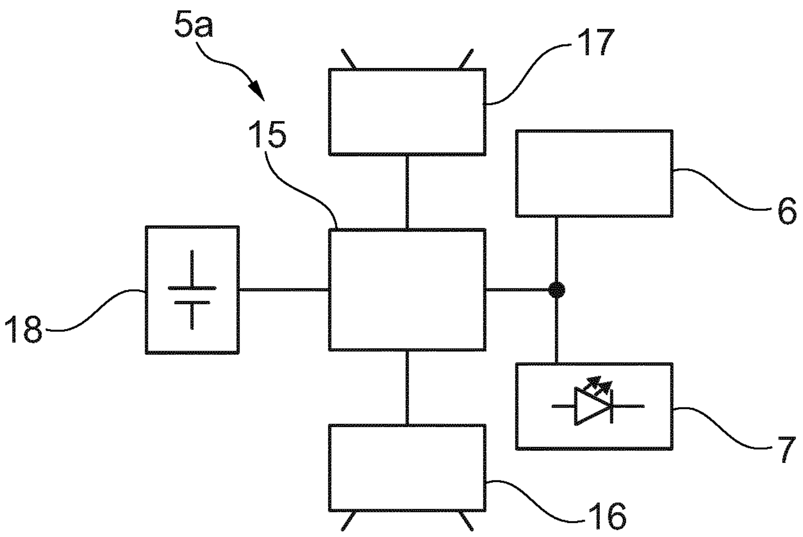
FIG. 4 shows a block diagram of an electronic display unit of the system.

FIG. 4 schematically shows a block diagram of an electronic construction of an ESL 5*a* (representative of ESLs 5*a* to 5*n*). The ESL 5*a* comprises a display module 15, which controls the screen 6 and the LED 7. The display module 15 is connected to the Bluetooth-Low-Energy-Beacon transmitter 16 via an internal bus and controls the same. Further the display module 15 is connected via the bus to the radio device 17 and can communicate via radio with the access point 11 by means of the radio device 17, i.e. it can receive and transmit data. Furthermore the ESL 5*a* comprises an internal energy source designed as a battery 18. The battery 18 supplies all electronic components of the ESL 5*a* with their supply voltage. The display module 15 comprises the central micro controller, which controls the blocks of the ESL and which provides the software-based functionalities such as radioing according to a radio protocol, processing of commands communicated via radio, controlling emission of the beacon and also controlling blinking of the LED 7. The screen can of course also comprise a separate controller, which provides the screen functions. The same applies to the radio module(s). Instead of the internal energy source/the battery 18 a cable-bound energy supply from outside may of course be provided, such as has been discussed e.g. in connection with FIG. 2. An ESL 5*a* to 5*n* designed according to the embodiment of FIG. 2 does not, by the way, provide a block 16 (Bluetooth radio) or a block 7 (LED). Such an ESL 5*a* to 5*n* however comprises a line-bound interface (such as contact elements for contacting the lines) for line-bound communication with the shelf rail control unit 13*a* to 13*d* as well as the electrical supply.

Figure 5:
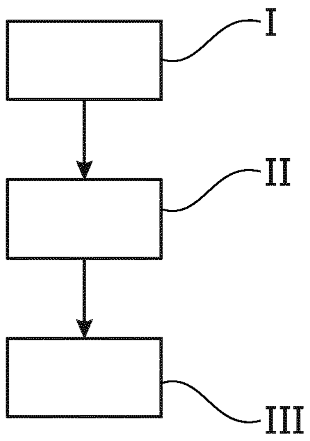
FIG. 5 shows a process sequence for logically linking the electronic display unit to a product.

FIG. 5 visualizes steps of the previously described method sequence.

In a first step I the beacon is emitted in consequence of fitting one of the ESLs 5*a* into the shelf rail 3*a*, wherein, depending on the embodiment this is initiated either by the ESL 5*a* to 5*n* itself or by the shelf rail control unit, 13*a* to 13*d*.

In a second step II, in consequence of receiving the beacon at the signal receiving device 10:

image detection is triggered by the camera 9, wherein the camera 9 forwards the detected image contents represented by the image data to the linking device 12, or continuous image detection by the camera 9 provided with a timestamp, which marks the point in time of the occurrence of the beacon (e.g. as separate timestamp data or embedded into the image contents communicated by the camera 9 as a predefined timestamp image element), wherein the camera 9 forwards the detected image contents to the linking device 12 either together with the separate timestamp data or with the predefined timestamp image element.

In a third step III, possibly in accordance with the separate timestamp data or the predefined timestamp image element, the ESL 5*a* emitting the beacon and the product 8*a* positioned correspondingly thereto, i.e. product 8*a* belonging to this ESL 5*a* is identified on the basis of an evaluation of the received image data by the linking device 12, and the ESL 5*a* is logically linked to this product 8*a*.

The method thus ensures automatic matching of a newly added ESL 5*a* to 5*n* to a product 8*a* to 8*n* positioned correspondingly thereto in accordance with the occurrence of the trigger signal, i.e. the beacon.

Subsequently the product and/or price information, which concerns the product 8*a*, is provided by the linking device 12 for the respective ESL 5*a* and radioed via the access point 11. In the embodiments according to FIGS. 1 and 3 the data, which represent the product and/or price information, are communicated directly via the access point 11 of the ESL 5*a* and in the embodiment according to FIG. 2 they are communicated indirectly to the ESL 5*a* with the interposition of the shelf rail control unit 13*a*.

As soon as this communication has finished, there can be a wait in the system for a digital confirmation message of the ESL 5*a*, in which the ESL 5*a* confirms that it has converted the received data and updated the content of its screen. This confirmation message is also communicated to the linking device 12 according to the respective embodiment either directly via the access point 11 or indirectly with the interposition of the shelf rail control unit 13*a*. If this confirmation message is, however, not received, taking into account a permitted timespan, up to the expiry of which the message could still arrive, a new attempt of communicating the product and/or price information to the ESL 5*a* can be made in the system or an alarm can be triggered, which prompts a staff member of the supermarket to check, whether the affected ESL could possibly be damaged.

With the embodiments described here it is, however, possible to also use the installed cameras 9 and the image data provided thereby to perform a check on the update of screen 6 of the respective ESL 5*a* to 5*n* at the linking device 12 on the one hand during initial supply of price and/or product information and also on the other hand during ongoing operation after each update of the respective ESL 5*a* to 5*n*.

Furthermore it can also be checked at the linking device 12 by means of the image data provided by the cameras 9, whether during ongoing operation the ESLs 5*a* to 5*e* are still positioned in the correct place corresponding to the positions of products 8*a* to 8*e*, with which they were logically linked and for which possibly an alarm was triggered in case of known deviations outside a tolerance range.

In summary the system provides the following functionalities, namely:

- a fully automatic detection of the newly added ESLs 5*a* to 5*n*,
- a fully automatic assignment of the newly added ESLs 5*a* to 5*n* to a positionally corresponding product 8*a* to 8*e*,
- a fully automatic establishment of the logical connection/linking of the respective ESL 5*a* to 5*n* to one of products 8*a* to 8*e* or to one of the groups of products 8*a* to 8*e*,
- a fully automatic transmission of the price and/or product information provided for the respective product,
- a fully automatic check of the correct conversion of this transmitted information on the screen of the respective ESL 5*a* to 5*n*,
- a continuous fully automatic monitoring of updates of the screen content transmitted by the respective ESL 5*a* to 5*n* and
- a fully automatic ongoing control of the position-related coincidence of the respective ESL 5*a* to 5*n* to the respectively assigned (linked) product 8*a* to 8*e*.

Generally it should be mentioned at this point that the camera 9 and its signal receiving device 10 can also be designed such that they can be mounted directly on a shelf rail 3*a* to 3*d*, i.e. that they can be attached there analogously to the ESLs 5*a* to 5*n*. Therefore there is no need for mounting them separately outside the shelves 2, and a camera 9 attached thus on a shelf 2 can detect the opposite shelf 2 across the shelf aisle 2 from the shelf 2 on which it is mounted.

In conclusion it should be pointed out once more that the figures described in detail above are merely exemplary embodiments, which may be modified by the expert in a wide variety of ways without leaving the scope of the invention. For completeness' sake it is also pointed out that the use of the indefinite article "a" does exclude that the respective features may also be present multiple times.

The invention claimed is:

1. A method of using an electronic shelf label system, the method comprising:

detecting, via a trigger stage of the electronic shelf label system, a user interaction with an electronic shelf label of the electronic shelf label system, wherein the electronic shelf label includes a display screen configured to display product information;

generating, via the trigger stage, a trigger signal based on the detected user interaction;

obtaining image data via an imaging device and based on the trigger signal, wherein the image data includes an optical depiction of the electronic shelf label and a product to be associated with the electronic shelf label;

analyzing the image data to identify the electronic shelf label and the product; and causing the display screen of the electronic shelf label to display information about the product.

2. The method of claim 1 wherein the electronic shelf label includes the trigger stage and wherein detecting the user interaction includes detecting a user interaction with the electronic shelf label via the electronic shelf label.

3. The method of claim 1 wherein:

the electronic shelf label system further includes a rail device configured to be coupled to a shelf and to receive and support the electronic shelf label, the trigger stage is configured to detect when the electronic shelf label has been coupled to the rail device, and wherein detecting the user interaction includes detecting when a user has coupled to the electronic shelf label to the rail device.

4. The method of claim 3 wherein:

the rail device includes the trigger stage, the electronic shelf label is configured to change an electrical state of the rail device when coupled to the rail device, the trigger stage is configured to detect the change to the electrical state of the rail device, and wherein detecting the user interaction includes detecting the change to the electrical state of the rail device.

5. The method of claim 3 wherein:

the rail device includes a power supply configured to provide power to the electronic shelf label when the electronic shelf label is coupled to the rail device, the power supply includes the trigger stage, the trigger stage is configured to detect a loading on the power supply caused by coupling the electronic shelf label to the rail device, and wherein detecting the user interaction includes detecting the loading on the power supply.

6. The method of claim 3 wherein:

the rail device includes— a rail controller, and a bus system configured to communicatively couple the rail controller to the electronic shelf label when the electronic shelf label is coupled to the rail device, the rail controller or the electronic shelf label includes the trigger stage, the trigger stage is configured to detect one or more communications between the electronic shelf label and the rail controller via the bus system when the electronic shelf label is coupled to the rail device, and wherein detecting the user interaction includes detecting the one or more communications.

7. The method of claim 1 wherein:

the electronic shelf label system further includes a signal receiving device operably coupled to the imaging device, the signal receiving device is configured to receive the trigger signal from the trigger stage and cause the imaging device to obtain the image data, and the method further comprises— receiving the trigger signal via the trigger stage, and causing, via the trigger stage, the imaging device to obtain the image data.

8. The method of claim 1 wherein generating the trigger signal includes generating an optical signal.

9. The method of claim 1 wherein generating the trigger signal includes generating a radio signal.

10. The method of claim 1 wherein:

the electronic shelf label further includes a user interface element, the trigger stage is configured to detect a user interaction with the user interface element, and wherein detecting the user interaction includes detecting the user interaction with the user interface element.

11. An electronic shelf label system, comprising:

an electronic shelf label including a display screen configured to display product information;

a trigger stage operably associated with the electronic shelf label and configured to detect a user interaction with the electronic shelf label;

an imaging device; and one or more processors operably coupled to the electronic shelf label and the trigger stage, wherein the one or more processors are configured to perform operations comprising— detecting, via the trigger stage, the user interaction with the electronic shelf label, generating, via the trigger stage, a trigger signal based on the detected user interaction, obtaining, via an imaging device and based on the trigger signal, image data including an optical depiction of the electronic shelf label and a product to be associated with the electronic shelf label, analyzing the image data to identify the electronic shelf label and the product, and causing the display screen of the electronic shelf label to display information about the product.

12. The electronic shelf label system of claim 11 wherein the electronic shelf label includes the trigger stage.

13. The electronic shelf label system of claim 11, further comprising a rail device configured to be coupled to a shelf and to receive and support the electronic shelf label, wherein the trigger stage is configured to detect when the electronic shelf label has been coupled to the rail device.

14. The electronic shelf label system of claim 13 wherein:

the rail device includes the trigger stage, the electronic shelf label is configured to change an electrical state of the rail device when coupled to the rail device, and the trigger stage is configured to detect the change to the electrical state of the rail device.

15. The electronic shelf label system of claim 13 wherein:

the rail device includes a power supply configured to provide power to the electronic shelf label when the electronic shelf label is coupled to the rail device, the power supply includes the trigger stage, and the trigger stage is configured to detect a loading on the power supply caused by coupling the electronic shelf label to the rail device.

16. The electronic shelf label system of claim 13 wherein:

the rail device includes— a rail controller, and a bus system configured to communicatively couple the rail controller to the electronic shelf label when the electronic shelf label is coupled to the rail device, the rail controller or the electronic shelf label includes the trigger stage, and the trigger stage is configured to detect communications between the electronic shelf label and the rail controller via the bus system.

17. The electronic shelf label system of claim 11, further comprising the imaging device and a signal receiving device operably coupled to the imaging device, wherein the signal receiving device is configured to receive the trigger signal from the trigger stage and cause the imaging device to obtain the image data.

18. The electronic shelf label system of claim 11 wherein the trigger signal includes an optical signal.

19. The electronic shelf label system of claim 11 wherein the trigger signal includes a radio signal.

20. The electronic shelf label system of claim 11 wherein the electronic shelf label further includes a user interface element, and wherein the trigger stage is configured to detect a user interaction with the user interface element.

* * * * *